(12) United States Patent
Chao et al.

(10) Patent No.: US 8,970,788 B2
(45) Date of Patent: Mar. 3, 2015

(54) GAIN-DETERMINING METHOD AND APPARATUS FOR GRAYSCALE WHITE BALANCE OF DISPLAY APPARATUS

(75) Inventors: Wen-Chwan Chao, Hsinchu (TW); Yi-Sheng Yu, Taoyuan (TW); Hsu-Pin Kao, Pingjhen (TW)

(73) Assignee: Marketech International Corp., Taipei (TW)

( * ) Notice: Subject to any disclaimer, the term of this patent is extended or adjusted under 35 U.S.C. 154(b) by 2204 days.

(21) Appl. No.: 11/892,115

(22) Filed: Aug. 20, 2007

(65) Prior Publication Data

US 2008/0117334 A1 May 22, 2008

(30) Foreign Application Priority Data

Nov. 17, 2006 (TW) .............................. 95142700 A

(51) Int. Cl.
| | | |
|---|---|---|
| *H04N 17/02* | (2006.01) | |
| *H04N 9/73* | (2006.01) | |
| *H04N 9/77* | (2006.01) | |
| *H04N 5/52* | (2006.01) | |
| *H04N 5/20* | (2006.01) | |
| *H04N 5/14* | (2006.01) | |

(52) U.S. Cl.
CPC . *H04N 5/20* (2013.01); *H04N 5/14* (2013.01); *H04N 9/73* (2013.01)
USPC ............ 348/656; 348/189; 348/655; 348/658

(58) Field of Classification Search
CPC .......... G09G 5/026; G09G 2320/0242; G09G 2320/0693
USPC .......................... 348/189, 656, 655, 657, 658
See application file for complete search history.

(56) References Cited

U.S. PATENT DOCUMENTS

| | | | |
|---|---|---|---|
| 5,315,378 A * | 5/1994 | Satou et al. ................... | 348/655 |
| 2003/0001958 A1* | 1/2003 | Hoshuyama ............... | 348/223.1 |
| 2003/0117414 A1* | 6/2003 | Sasaki ........................... | 345/589 |
| 2006/0107301 A1* | 5/2006 | Leibbrandt et al. ........... | 725/134 |

OTHER PUBLICATIONS

Tanenbaum, Andrew S., "Structured Computer Organization", 1984, Prentice-Hall, Inc., 2nd Ed., p. 11.*

* cited by examiner

*Primary Examiner* — Benjamin R Bruckart
*Assistant Examiner* — Jason Thomas
(74) *Attorney, Agent, or Firm* — Bacon & Thomas, PLLC

(57) ABSTRACT

A gain-determining method for grayscale white balance of a display apparatus comprising a panel is provided. The method first displays a white, a red, a green, and a blue images on the panel respectively and measures the chromatic values and luminance of the images. Next, the chromatic values and luminance of a target white image is inputted. Following, according to the measured chromatic values and luminance of the white, the red, the green and the blue images, a first set of color mixture ratios is calculated. Then, according to the chromatic values and luminance of the target white image and the chromatic values and luminance of the red, the green and the blue images, a second set of color mixture ratios is calculated. Finally, according to the first set and the second set of color mixture ratios, a red gain, a green gain and a blue gain are calculated.

5 Claims, 2 Drawing Sheets

GAIN-DETERMINING METHOD AND APPARATUS FOR GRAYSCALE WHITE BALANCE OF DISPLAY APPARATUS

BACKGROUND OF THE INVENTION

1. Field of the Invention

This invention relates to a method and apparatus of gain-determining and, more particularly, to a gain-determining method and a related apparatus for adjusting the grayscale white balance of a display apparatus.

2. Description of the Prior Art

With the progress of the technology and art of manufacturing, display apparatuses such as television also evolve continuously. The transition from analog form to digital form allows the application of image signals to be more broad and abounding. The panel for displaying images is also changed from heavy CRT to thin LCD and PDP. In the meanwhile, the size of panels also tends to be larger and larger. When the size of a panel is enlarged, the performance of image resolution of the panel becomes more important. In the performance of color, the saturation of color, the chromatic value, and the luminance are major factors which determine the quality of a display apparatus.

The image processing technology nowadays divides the displaying area on the panel into several pixel areas, and every pixel area has a red pixel, a green pixel, and a blue pixel. Because the color of all visible light can be generated by mixing red light, green light, and blue light, a pixel can display the desired color by controlling the light and shade of the red pixel, the green pixel, and the blue pixel. Due to factors such as the material of a panel and its manufacturing process, the color performance of every display apparatus is different after assembling. In order to keep the color performance correct and uniform before exporting, the grayscale white balance of every display apparatus must be adjusted.

The adjusting method of grayscale white balance is: first, display a white image on the display apparatus; then, adjust the gains of sharpness of red color, green color, and blue color to make the chromatic values and luminance of the white image, obtained by mixing the three colors, approach the chromatic values and luminance of a target white image, that is to adjust the white image within a certain range of color temperature and color differences.

In prior art, the adjusting of grayscale white balance is mostly achieved by adjusting the gains of the sharpness of the red color, green color, and blue color by hand. However, adjusting by hand wastes a lot of time; at the same time, the difference between operations of people makes it difficult to achieve uniform quality of each product. Due to these defects in the prior art, the inventor provides the invention to improve the adjusting process for promoting the manufacturing capability and quality.

SUMMARY OF THE INVENTION

Accordingly, one scope of the invention is to provide a gain-determining apparatus for grayscale white balance of a display apparatus. The gain-determining apparatus adjusts the gains of sharpness of red color, green color, and blue color by automatically measuring to save working time and to promote the manufacturing capability of display apparatuses.

Another scope of the invention is to provide a gain-determining method for grayscale white balance of a display apparatus. The gain-determining method generates the gains of sharpness of red color, green color, and blue color by automatically measuring to achieve higher unity and to promote the quality of display apparatuses.

According to a gain-determining apparatus of a preferred embodiment of the invention, the gain-determining apparatus applies to a display apparatus which includes a panel. The display apparatus is able to respectively display a full red image, a full green image, a full blue image, and a full white image on the panel. The full white image is formed by mixing the full red image, the full green image, and the full blue image. The chromatic values and the luminance of the full white image, the full red image, the full green image, and the full blue image displayed on the panel can all be measured respectively.

The gain-determining apparatus includes a first receiving module, a second receiving module, a third receiving module, a fourth receiving module, a fifth receiving module, a first calculating module, a second calculating module, and a third calculating module. The first receiving module is configured to receive the measured chromatic values and the measured luminance of the full white image. The second receiving module is configured to receive the measured chromatic values and the measured luminance of the full red image. The third receiving module is configured to receive the measured chromatic values and the measured luminance of the full green image. The fourth receiving module is configured to receive the measured chromatic values and the measured luminance of the full blue image. The fifth receiving module is configured to receive the inputting of chromatic values and luminance of a target white image. The first calculating module is configured to calculate a first set of color mixture ratios in accordance with the measured chromatic values and the measured luminance of the full white image, the full red image, the full green image, and the full blue image with a law of color mixture. The second calculating module is configured to calculate a second set of color mixture ratios in accordance with the chromatic values and the luminance of the target white image, the measured chromatic values and the measured luminance of the full red image, the full green image, and the full blue image with the law of color mixture. The third calculating module is configured to calculate a red gain, a green gain, and a blue gain in accordance with the first set of color mixture ratios and the second set of color mixture ratios.

The above-mentioned law of color mixture is the Grassmann's law of color mixture.

According to a gain-determining method of a preferred embodiment of the invention, the gain-determining method is suitable for grayscale white balance of a display that includes a panel. First, the gain-determining method displays a full white image on the panel of the display apparatus and measures chromatic values and luminance of the full white image displayed on the panel, wherein the full white image is formed by mixing a full red image, a full green image, and a full blue image. Then, the gain-determining method displays the full red image on the panel of the display apparatus and measures chromatic values and luminance of the full red image displayed on the panel. Next, the gain-determining method displays the full green image on the panel of the display apparatus and measures chromatic values and luminance of the full green image displayed on the panel. Then, the gain-determining method displays the full blue image on the panel of the display apparatus and measures chromatic values and luminance of the full blue image displayed on the panel. Furthermore, the gain-determining method inputs chromatic values and luminance of a target white image. Then, the gain-determining method calculates a first set of color mixture ratios in accordance with the measured chromatic values and the measured luminance of the full white image, the full red image, the full green image, and the full blue image with a law of color mixture. Then, the gain-determining method calculates a second set of color mixture ratios in accordance with the chromatic values and the luminance of the target white image, the measured chromatic values and the measured luminance of the full red image, the full green image, and the full blue image with the law of color mixture. Finally, the gain-determining method calculates a red gain, a green gain, and a blue gain in accordance with the first set of color mixture ratios and the second set of color mixture ratios.

The advantage and spirit of the invention may be understood by the following recitations together with the appended drawings.

BRIEF DESCRIPTION OF THE APPENDED DRAWINGS

DETAILED DESCRIPTION OF THE INVENTION

The invention provides a gain-determining method and a gain-determining apparatus for grayscale white balance of a display apparatus.

Figure 1:
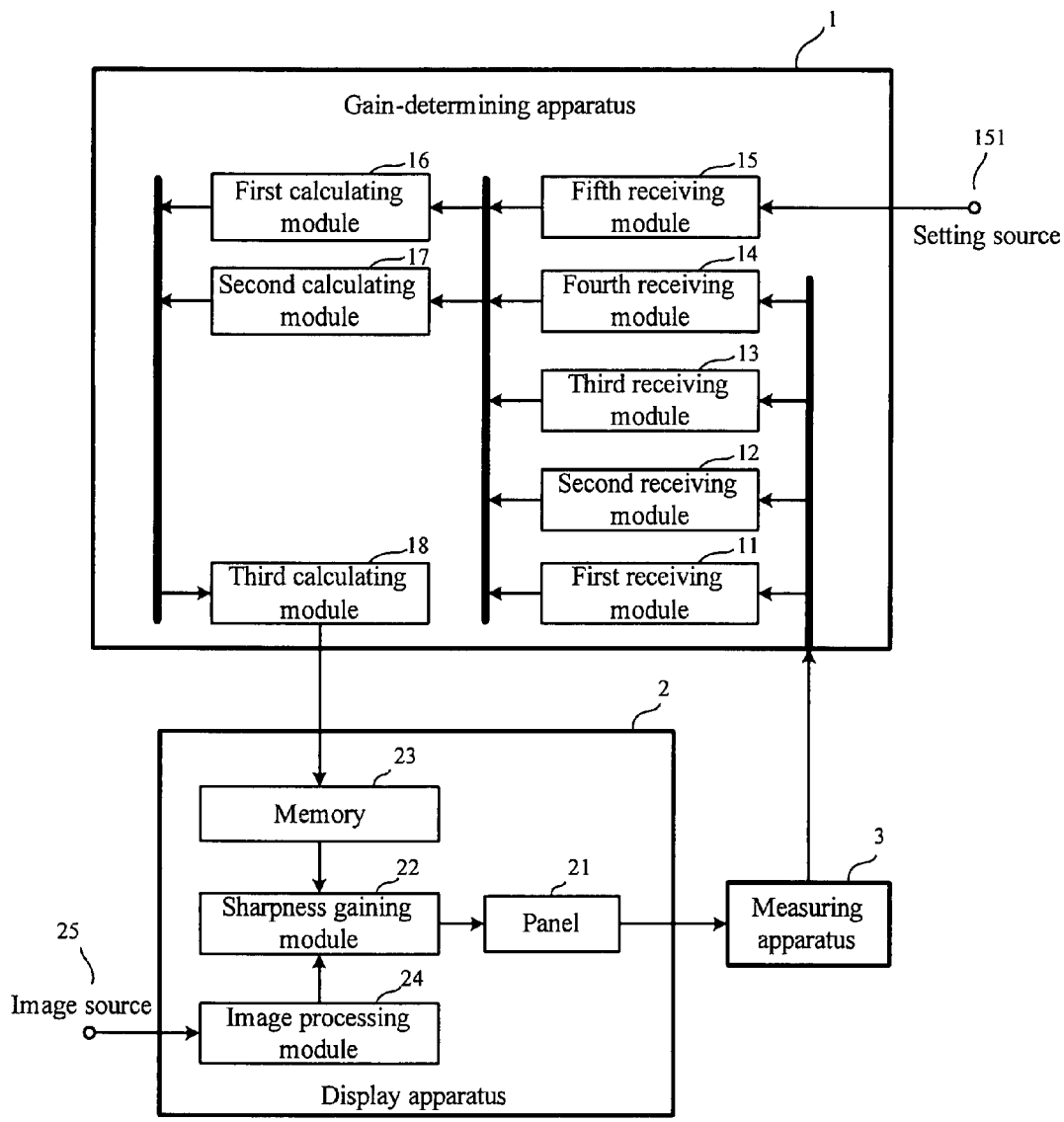
FIG. 1 is a schematic diagram illustrating an infrastructure of a gain-determining apparatus for grayscale white balance of a display apparatus of a preferred embodiment of the invention.

Referring to FIG. 1, FIG. 1 is a schematic diagram illustrating an infrastructure of a gain-determining apparatus 1 for grayscale white balance of a display apparatus 2 of a preferred embodiment of the invention. The gain-determining apparatus 1 determines a red gain, a green gain, and a blue gain in a grayscale white balance adjusting process of a display apparatus 2, so as to respectively adjust the sharpness of the red color, the sharpness of the green color, and the sharpness of the blue color.

As shown in FIG. 1, the display apparatus 2 includes a panel 21, a sharpness gaining module 22, a memory 23, an image processing module 24, and an image source 25. The memory 23 is for storing a red gain, a green gain, and a blue gain. The image processing module 24 is for proceeding image processing procedures (such as decoding) on the image signals transmitted by the image source 25. The sharpness gaining module 22 adjusts the gain of sharpness of the image signals of the red color, the green color, and the blue color transmitted by the image processing module 24 according to the red gain, the green gain, and the blue gain. The sharpness-gained signals are then transmitted to the panel 21 to display.

According to a law of color mixture (referring to the Grassmann's law of color mixture), all colors of light can be generated by mixing red light, green light, and blue light in accordance with specific color mixture ratios. The inventor of the invention utilizes color mixture ratios and automatic measuring technology to improve the adjusting process for grayscale white balance of the display apparatus 2. The chromatic values and the luminance of the full white image, the full red image, the full green image, and the full blue image displayed on the panel 21 of the display apparatus 2 can first be measured, and then a first set of color mixture ratios in accordance with the measured chromatic values and the measured luminance of the full white image, the full red image, the full green image, and the full blue image can be calculated. Then, a second set of color mixture ratios can be calculated in accordance with the chromatic values and the luminance of the target white image, the measured chromatic values and the measured luminance of the full red image, the full green image, and the full blue image. Finally, a red gain, a green gain, and a blue gain are calculated in accordance with the first set of color mixture ratios and the second set of color mixture ratios, and the red gain, the green gain, and the blue gain are inputted to the memory 23 of the display apparatus 2.

Thereupon, the concept of the invention will be illustrated in figures. The display apparatus 2 in FIG. 1 is able to respectively display a full red image, a full green image, a full blue image, and a full white image on the panel 21. The full white image is formed by mixing the full red image, the full green image and the full blue image. A measuring apparatus 3, which is used for measuring optical properties such as chromatic values and the luminance, in FIG. 1 is an optical measuring instrument. When the panel 21 displays the full white image, the full red image, the full green image and the full blue image, the measuring apparatus 3 retrieves the images and inputs the chromatic values and the luminance of the retrieved images into the gain-determining apparatus 1.

As shown in FIG. 1, the gain-determining apparatus 1 has a first receiving module 11, a second receiving module 12, a third receiving module 13, a fourth receiving module 14, a fifth receiving module 15, a first calculating module 16, a second calculating module 17, and a third calculating module 18.

The first receiving module 11, the second receiving module 12, the third receiving module 13, and the fourth receiving module 14 are electrically configured to the measuring apparatus 3. The first receiving module 11 is for receiving the chromatic values and the luminance of the full white image. The second receiving module 12 is for receiving the chromatic values and the luminance of the full red image. The third receiving module 13 is for receiving the chromatic values and the luminance of the full green image. The fourth receiving module 14 is for receiving the chromatic values and the luminance of the full blue image. The fifth receiving module 15 is for receiving the chromatic values and the luminance of a target white image inputted by a setting source 151.

The first calculating module 16 calculates a first set of color mixture ratios in accordance with the measured chromatic values and the measured luminance of the full white image, the full red image; the full green image, and the full blue image with the law of color mixture mentioned above. The first set of color mixture ratios ($m_{rp}$, $m_{gp}$, $m_{Bp}$) is represented as formula (1):

$$W_p = m_{rp} R_p + m_{gp} G_p + m_{bp} B_p \qquad (1)$$

Formula (1) represents that a unit of intensity of the full white image $W_P$ can be generated by mixing $m_{rp}$ unit of intensity of red image $R_P$, $m_{gp}$ unit of intensity of green image $G_P$, and $m_{Bp}$ unit of intensity of blue image $B_P$. Formula (1) derived from the chromatic values and the luminance of color images is from prior art, so there will not be any more discussion.

The second calculating module 17 calculates a second set of color mixture ratios in accordance with the chromatic values and luminance of the target white image, the measured chromatic values and the measured luminance of the full red image, the full green image, and the full blue image with the law of color mixture. The second set of color mixture ratios ($m_{ri}$, $m_{gi}$, $m_{Bi}$) is represented as formula (2):

$$W_i = m_{ri} R_p + m_{gi} G_p + m_{bi} B_p \qquad (2)$$

Formula (2) represents that a unit of intensity of target white image $W_i$ can be generated by mixing $m_{ri}$ unit of intensity of red image $R_P$, $m_{gi}$ unit of intensity of green image $G_P$, and $m_{bi}$ unit of intensity of blue image $B_P$.

According to formula (1) and (2), if we want to adjust $W_P$ in formula (1) to equal $W_i$ in formula (2), the red image $R_P$, the green image $G_P$, and the blue image $B_P$ in formula (1) need to be respectively multiplied by a red gain $c_r$, a green gain $c_g$, and a blue gain $c_b$. Then formula (3) can be derived as follows:

$$W_i = c_r m_{rp} R_P + c_g m_{gp} G_P + c_b m_{bp} B_P \quad (3)$$

Formula (4), (5), and (6) can also be derived as follows:

$$c_r = \frac{m_{ri}}{m_{rp}} \quad (4)$$

$$c_g = \frac{m_{gi}}{m_{gp}} \quad (5)$$

$$c_b = \frac{m_{bi}}{m_{bp}} \quad (6)$$

The third calculating module 18 calculates a red gain $c_r$, a green gain $c_g$, and a blue gain $c_b$ by substituting the first set of color mixture ratios ($m_{rp}$, $m_{gp}$, $m_{bp}$), which is calculated by the first calculating module 16, and the second set of color mixture ratios ($m_{ri}$, $m_{gi}$, $m_{bi}$), which is calculated by the second calculating module 17, into formula (4), (5), and (6). The third calculating module 18 then outputs the results to the memory 23 of the display apparatus 2.

Furthermore, for the benefit of the processes of digital circuit, the third calculating module 18 digitizes the red gain $c_r$, the green gain $c_g$, and the blue gain $c_b$ before outputting the results. In the first step, the third calculating module 18 normalizes the gains of the three colors in accordance with the largest value of the red gain $c_r$, the green gain $c_g$, and the blue gain $c_b$. Then, the third calculating module 18 enlarges the normalized gains of the three colors with a power of 2.

Figure 2:
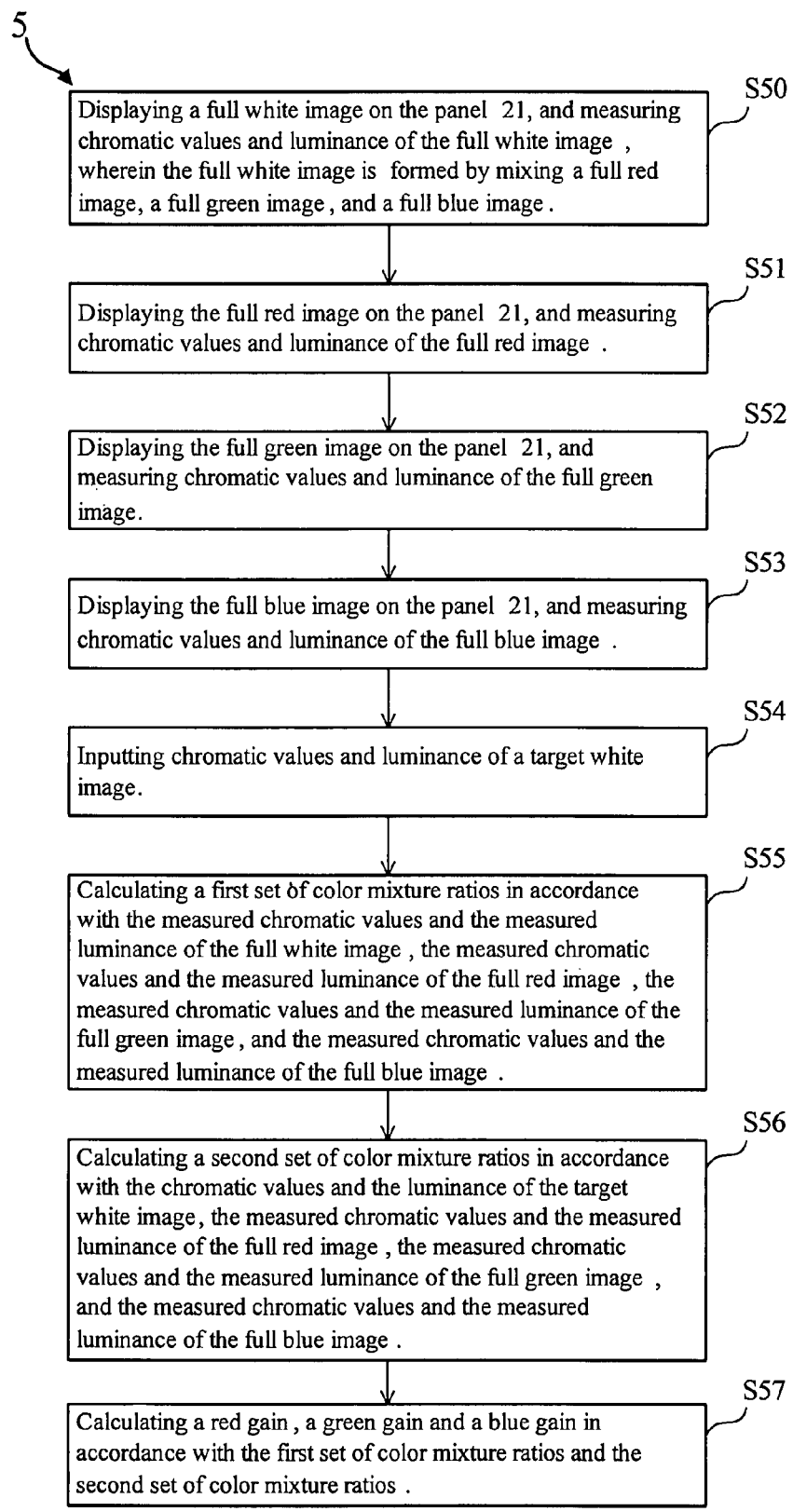
FIG. 2 is a process flow chart showing a gain-determining method of the gain-determining apparatus of the preferred embodiment of the invention.

Subsequently, referring to FIG. 2, FIG. 2 is a process flow chart showing a gain-determining method 5 of the gain-determining apparatus 1 of the preferred embodiment of the invention. Please refer to FIG. 1 and formula (1) to formula (6) the related infrastructure, elements, and formulas. As shown in FIG. 2, the gain-determining method 5 includes the following steps.

First, the display apparatus 2 displays a full white image on the panel 21. At the same time, the measuring apparatus 3 measures the chromatic values and the luminance of the full white image, wherein the full white image is formed by mixing a full red image, a full green image, and a full blue image (step S50).

Then, the display apparatus 2 displays the full red image on the panel 21. At the same time, the measuring apparatus 3 measures the chromatic values and the luminance of the full red image (step S51).

Next, the display apparatus 2 displays the full green image on the panel 21. At the same time, the measuring apparatus 3 measures the chromatic values and the luminance of the full green image (step S52).

Then, the display apparatus 2 displays the full blue image on the panel 21. At the same time, the measuring apparatus 3 measures the chromatic values and the luminance of the full blue image (step S53).

Furthermore, the chromatic values and the luminance of a target white image are inputted (step S54).

Then, a first set of color mixture ratios ($m_{rp}$, $m_{gp}$, $m_{bp}$) are calculated in accordance with the measured chromatic values and the measured luminance of the full white image, the full red image, the full green image, and the full blue image with a law of color mixture (step S55).

Next, a second set of color mixture ratios ($m_{ri}$, $m_{gi}$, $m_{bi}$) are calculated in accordance with the chromatic values and the luminance of the target white image, the measured chromatic values and the measured luminance of the full red image, the full green image, and the full blue image with the law of color mixture (step S56).

Finally, a red gain $c_r$, a green gain $c_g$, and a blue gain $c_b$ are calculated in accordance with the first set of color mixture ratios ($m_{rp}$, $m_{gp}$, $m_{bp}$) and the second set of color mixture ratios ($m_{ri}$, $m_{gi}$, $m_{bi}$) (step S57).

After the step S57 of the above-mentioned gain-determining method 5, the red gain $c_r$, the green gain $c_g$, and the blue gain $c_b$ are immediately inputted into the display apparatus 2.

In the above-mentioned gain-determining method, the law of color mixture is the Grassmann's law of color mixture.

Accordingly, the gain-determining apparatus and the gain-determining method for grayscale white balance of a display apparatus provided by the invention are able to automatically measure gains of red color, green color, and blue color. By the way, the working time can be saved and the manufacturing capability of display apparatuses can be promoted. At the same time, the unity of the features of products can be improved, and the qualities of display apparatuses are enhanced.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A gain-determining method for grayscale white balance of a display apparatus comprising a panel, said gain-determining method comprising the steps of:

displaying a full white image $W_P$ on the panel of the display apparatus, and measuring chromatic values and luminance of the full white image $W_P$ displayed on the panel, wherein the full white image $W_P$ is formed by mixing a full red image $R_P$, a full green image $G_P$ and a full blue image $B_P$;

displaying the full red image $R_P$ on the panel of the display apparatus, and measuring chromatic values and luminance of the full red image $R_P$ displayed on the panel;

displaying the full green image $G_P$ on the panel of the display apparatus, and measuring chromatic values and luminance of the full green image $G_P$ displayed on the panel;

displaying the full blue image $B_P$ on the panel of the display apparatus, and measuring chromatic values and luminance of the full blue image $B_P$ displayed on the panel;

inputting chromatic values and luminance of a target white image $W_i$ to the display apparatus;

calculating a first set of color mixture ratios ($m_{rp}$, $m_{gp}$, $m_{bp}$) with respect to the measured chromatic values and luminance of the full white image $W_P$ based on the measured chromatic values and luminance of the full red, green and blue images $R_P$, $G_P$, $B_P$, in accordance with a law of color mixture, respectively, wherein the first set of color mixture ratios ($m_{rp}$, $m_{gp}$, $m_{bp}$) is represented as $W_P = m_{rp} R_P + m_{gp} G_P + m_{bp} B_P$;

calculating a second set of color mixture ratios $m_{ri}$, $m_{gi}$, $m_{bi}$) with respect to the chromatic values and the luminance of the target white image $W_i$ based on the measured chromatic values and luminance of the full red, green and blue images $R_P$, $G_P$, $B_P$, in accordance with the law of color mixture, respectively, wherein the second set of color mixture ratios ($m_{ri}$, $m_{gi}$, $m_{bi}$) is represented as $W_i = m_{ri}R_p + m_{gi}G_p + m_{bi}B_p$;

calculating a red gain $c_r$, a green gain $c_g$, and a blue gain $c_b$, in accordance with the first set of color mixture ratios and the second set of color mixture ratios, respectively, wherein $$c_r = \frac{m_{ri}}{m_{rp}}, c_g = \frac{m_{gi}}{m_{gp}}, c_b = \frac{m_{bi}}{m_{bp}};$$

and enabling the display apparatus to adjust a grayscale white balance of an image being inputted to the panel, in accordance with the red, green and blue gains $c_r$, $c_g$, $c_b$, to another grayscale white balance in relation to the chromatic values and the luminance of the target white image $W_i$.

2. The gain-determining method of claim 1, wherein the law of color mixture is the Grassmann's law of color mixture.

3. A gain-determining apparatus for grayscale white balance of a display apparatus comprising a panel, wherein the display apparatus displays a full red image $R_P$, a full green image $G_P$, a full blue image $B_P$, and a full white image $W_P$ formed by mixing the full red, green and blue images $R_P$, $G_P$, $B_P$ on the panel respectively, and chromatic values and luminance of the full white image $W_P$, the full red, green and blue images $R_P$, $G_P$, $B_P$ displayed on the panel are measured respectively;

said gain-determining apparatus comprising:
- a first receiving module, configured to receive a measured chromatic values and luminance of the full white image $W_P$;
- a second receiving module, configured to receive a measured chromatic values and luminance of the full red image $R_E$;
- a third receiving module, configured to receive a measured chromatic values and luminance of the full green image $G_P$;
- a fourth receiving module, configured to receive a measured chromatic values and luminance of the full blue image $B_P$;
- a fifth receiving module, configured to receive chromatic values and luminance of a target white image $W_i$ being inputted to the display apparatus;
- a first calculating module, configured to calculate a first set of color mixture ratios ($m_{rp}$, $m_{gp}$, $m_{bp}$) with respect to the measured chromatic values and luminance of the full white image $W_P$ based on the measured chromatic values and luminance of the full red, green and blue images $R_P$, $G_P$, $B_P$, in accordance with a law of color mixture, respectively, wherein the first set of color mixture ratios ($m_{rp}$, $m_{gp}$, $m_{bp}$) is represented as $W_p = m_{rp}R_p + m_{gp}G_p + m_{bp}B_p$;
- a second calculating module configured to calculate a second set of color mixture ratios ($m_{ri}$, $m_{gi}$, $m_{bi}$) with respect to the chromatic values and luminance of the target white image $W_i$ based on the measured chromatic values and luminance of the red, green and blue images $R_P$, $G_P$, $B_P$, in accordance with the law of color mixture, respectively, wherein the second set of color mixture ratios ($m_{ri}$, $m_{gi}$, $m_{bi}$) is represented as $W_i = m_{ri}R_p + m_{gi}G_p + m_{bi}B_p$; and
- a third calculating module, configured to calculate a red gain $c_r$, a green gain $c_g$ and a blue gain $c_b$ in accordance with the first set of color mixture ratios and the second set of color mixture ratios, respectively, wherein $$c_r = \frac{m_{ri}}{m_{rp}}, c_g = \frac{m_{gi}}{m_{gp}}, c_b = \frac{m_{bi}}{m_{bp}};$$

thereby the display apparatus is able to adjust a grayscale white balance of an image being inputted to the panel, in accordance with the red, green and blue gains $c_r$, $c_g$, $c_b$, to another grayscale white balance in relation to the chromatic values and luminance of the target white image $W_i$.

4. The gain-determining apparatus of claim 3, wherein the gain-determining apparatus is coupled to a measuring apparatus which is for measuring the chromatic values and the luminance of the full white image $W_P$, the chromatic values and the luminance of the full red, green and blue images $R_P$, $G_P$, $B_P$ displayed on the panel respectively, and the measuring apparatus respectively outputs the measured results to the first receiving module, the second receiving module, the third receiving module, and the fourth receiving module.

5. The gain-determining apparatus of claim 3, wherein the law of color mixture is the Grassmann's law of color mixture.

* * * * *